(12) United States Patent
Schannach et al.

(10) Patent No.: US 6,300,877 B1
(45) Date of Patent: Oct. 9, 2001

(54) DSX BAYTRACER ILLUMINATOR

(75) Inventors: John G. Schannach, Eagan; Steven M. Swam, Shakopee; Jason K. Foley, Coon Rapids; David J. Streitz, Burnsville, all of MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/522,520

(22) Filed: Mar. 10, 2000

(51) Int. Cl.[7] .................................................. G08B 21/00
(52) U.S. Cl. ........................ 340/635; 340/654; 340/657
(58) Field of Search ...................................... 340/635, 657, 340/654

(56) References Cited

U.S. PATENT DOCUMENTS

| | | | | |
|---|---|---|---|---|
| 4,618,194 | * | 10/1986 | Kwilos | 339/14 R |
| 5,110,030 | * | 5/1992 | Tanji | 227/130 |
| 5,170,327 | * | 12/1992 | Burroughs | 361/392 |
| 5,418,334 | * | 5/1995 | Williams | 178/1 |
| 5,725,142 | * | 3/1998 | Hamada | 227/130 |

* cited by examiner

Primary Examiner—Julie Lieu
(74) Attorney, Agent, or Firm—Merchant & Gould P.C.

(57) ABSTRACT

A monitor circuit for indicating whether a digital cross-connect bay has a cross-connect jack that cross connects equipment being tested that includes a non-intrusive sensor for sensing current changes in a power feed line of the bay being monitored. The non-intrusive sensor is operatively coupled to a sensor device that generates a signal to activate an external sensor if a current change is detected by the sensor. The sensor device is powered from the same power supply as the bay it is monitoring.

26 Claims, 6 Drawing Sheets

DSX BAYTRACER ILLUMINATOR

FIELD OF THE INVENTION

The present invention relates to an indicator circuit for digital signal cross-connect (DSX) bays, and, more particularly, to an indicator circuit for indicating to a technician in which bay to find a flashing tracer lamp indicator.

BACKGROUND OF THE INVENTION

A digital cross-connect system (DSX) provides a location for interconnecting two digital transmission paths. The apparatus for a DSX is located in one or more frames, generally referred to as bays, usually in a telephone central office. The DSX apparatus also provides jack access to the transmission paths to trace a transmission path through the DSX.

DSX jacks are well known and typically include a plurality of bores sized for receiving plugs. U.S. Pat. No. 5,170,327, assigned to the present assignee, describes such a jack. The jacks are typically electrically connected to digital transmission lines, and are also electrically connected to a plurality of wire termination members used to cross-connect the jacks. By inserting plugs within the bores of the jacks, signals transmitted through the jacks can be traced as is well known. If a technician wants to know what a particular piece of equipment is coupled to through the DSX, the technician would insert a plug into a monitor bore of the jack coupled to that particular piece of equipment and look for a flashing light located on a second jack which is coupled to an end piece of equipment, i.e., the cross-connected equipment. This allows the technician to trace the transmission path through the DSX and determine what equipments are coupled together.

Each tracer lamp is located on a particular shelf in a particular row of a particular bay. There are generally several bays in any communications office. Typically, the tracer lamp only flashes for about 45 seconds. In a small central office this may be enough time to give the technician to find the other end of the circuit. In larger central offices with many bays, however, this is not enough time since the technician is not directed to any particular bay and thus must check each one until he discovers the illuminated tracer lamp. In both cases, tracing a transmission path is time consuming and tedious.

U.S. Pat. No. 5,418,334 describes a relative position tracer lamp to indicate to a technician which shelf or rack to find the flashing tracer lamp indicator thereby reducing the technician's search for the flashing tracer lamp. The particular implementation described in this patent, however, suffers from several disadvantages. First, the circuitry employed requires a separate DC power source which makes it undesirable in a central office environment in which −48 volts is the available power supply. In addition, an intrusive technique, i.e., serial connection, is used to couple a transformer to a particular tracer wire thereby making it cumbersome to implement because of the direct wiring necessary.

Thus, it is desirable to provide a relative indicator that does not require its own power supply. In addition, it is desirable to provide a relative indicator that utilizes a non-intrusive method of detecting current change in a bay. Also, it is desirable to provide a relative indicator that reduces the overall effort and amount of wiring to be performed during installation.

SUMMARY OF THE INVENTION

According to a first aspect of the invention, there is provided a monitor circuit for indicating whether a digital signal cross-connect bay has a cross-connect jack that cross-connects equipment being tested. The circuit includes a sensor, a comparator, an indicator and a linear filter. The sensor has an input operatively coupled to a steady-state DC current carrying wire and detects a change in current flowing in the wire and generates an output signal at its output upon detection of a change. The comparator has an input operatively coupled to the output of the sensor and the comparator generates an output signal if the output of the sensor is above a predetermined level. The indicator is operatively coupled to the output of the comparator and the linear filter is coupled to a power supply that also supplies power to the cross-connect bay for powering the monitor circuit. The comparator sends a signal to the indicator if the sensor detects a current change in the power feed wire of the bay, causing the indicator to generate an indication.

According to a second aspect of the invention, there is provided a monitor circuit for indicating whether a digital signal cross-connect bay has a cross-connect jack that cross-connects equipment being tested. The circuit includes a comparator, an indicator and a linear filter. The comparator receives a signal output by a sensor that senses a change in current in a power feed wire of the bay. The indicator is operatively coupled to an output of the comparator and the linear filter is coupled to a power supply that also supplies power to the cross-connect bay for powering the monitor circuit. The comparator sends a signal to the indicator if the sensor detects a current change in the power feed wire of the bay causing the indicator to generate an indication.

According to a third aspect of the invention, there is provided a monitor circuit for indicating whether a digital signal cross-connect bay has a cross-connect jack that cross-connects equipment being tested. The circuit includes a balanced amplifier, a comparator and an indicator. The balanced amplifier receives a signal output by a sensor that senses a change in current in a power feed wire of the bay. The comparator is operatively coupled to an output of the balanced amplifier and the indicator is operatively coupled to an output of the comparator. The comparator sends a signal to the indicator if the sensor detects a current change in the power feed wire of the bay causing the indicator to generate an indication.

DETAILED DESCRIPTION OF THE PRESENTLY PREFERRED EMBODIMENT

In a preferred embodiment, the sensor device of the present invention is designed to be an accessory device used to expedite cross-connect tasks within a central office environment.

DSX communication systems within a central office consist of a number of DSX bays all having multiple DSX jacks therein cross-connecting equipment. Thus, a technician may be tracing a transmission path connecting bays that are remote from one another. In some cases, the bays may be in separate rooms. In order to assist the technician in locating the far end of an engaged tracer circuit, the sensor device is used to indicate the particular bay in which the engaged tracer circuit is located. In addition, the sensor device of the present invention can be used to indicate the particular shelf in a bay in which the engaged tracer circuit is located.

Figure 1:
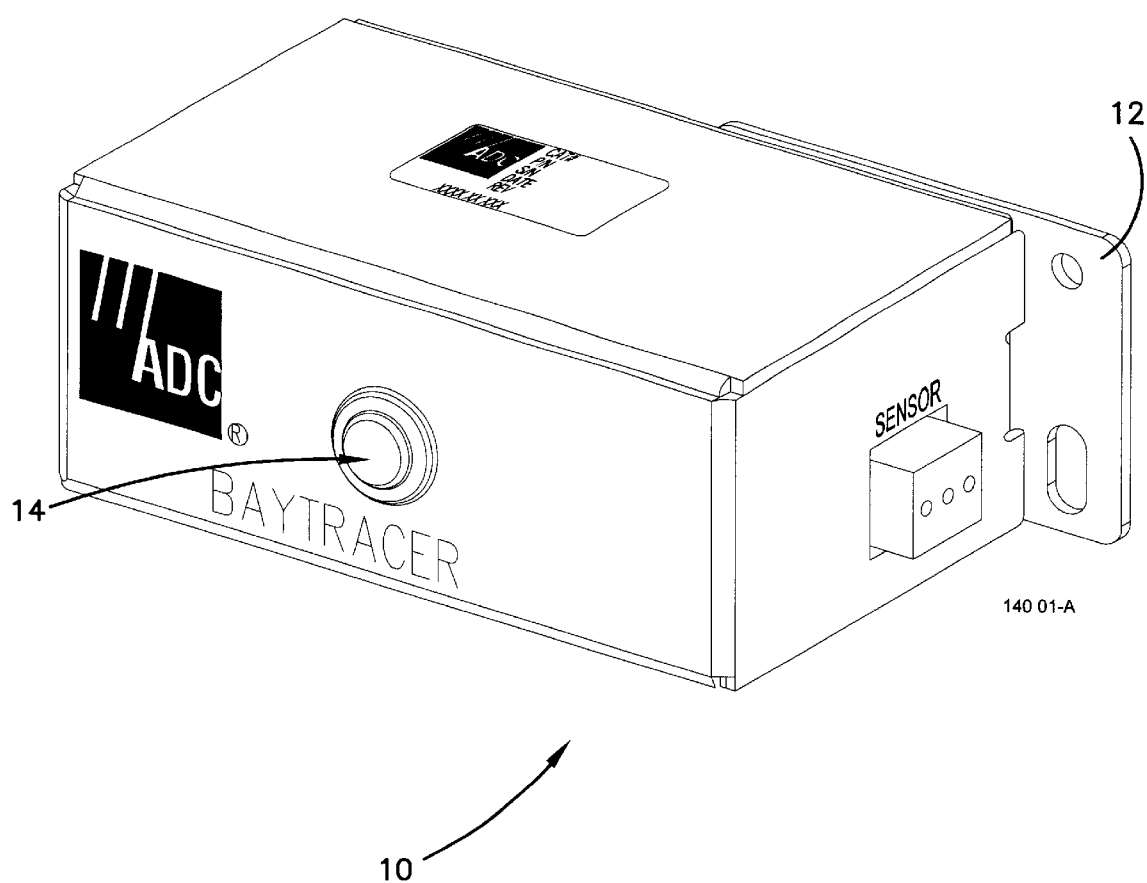
FIG. 1 is a perspective view of a sensor device according to a preferred embodiment of the present invention.

FIG. 1 is a perspective view of a sensor device 10 according to a preferred embodiment of the present invention. In this example, the sensor device is used to indicate the particular bay in which the engaged tracer circuit is located. The sensor, however, can be used to monitor any wire carrying a steady-state DC current. Thus, tracer wires, cable powering a shelf in a bay, cable powering an entire bay and multiple cables powering multiple bays can all be monitored by one or more sensor device according to the present invention. The device 10 is preferably a stand-alone device that mounts on the top of a DSX bay via mounting plate 12. An indicator 14 such as an LED or lamp is mounted on the device 10 and provides a large, bright, easily observable, visual indication whenever an individual jack tracer lamp is activated on a DSX bay. This allows a technician to identify the far end bay so that a scan can be performed to identify the specific jack tracer lamp that has been activated.

In a preferred embodiment, the indicator of the sensor device flashes for a nominal period of about 90 seconds. After the 90 second flashing cycle, the tracer lamp is extinguished and reset in preparation for the next tracer event. The individual DSX jack tracer lamp within the bay flashes for about 30 seconds and stays lit in a steady on-state until deactivated. The individual jack tracer lamps are not affected by the sensor device of the present invention.

Figure 2:
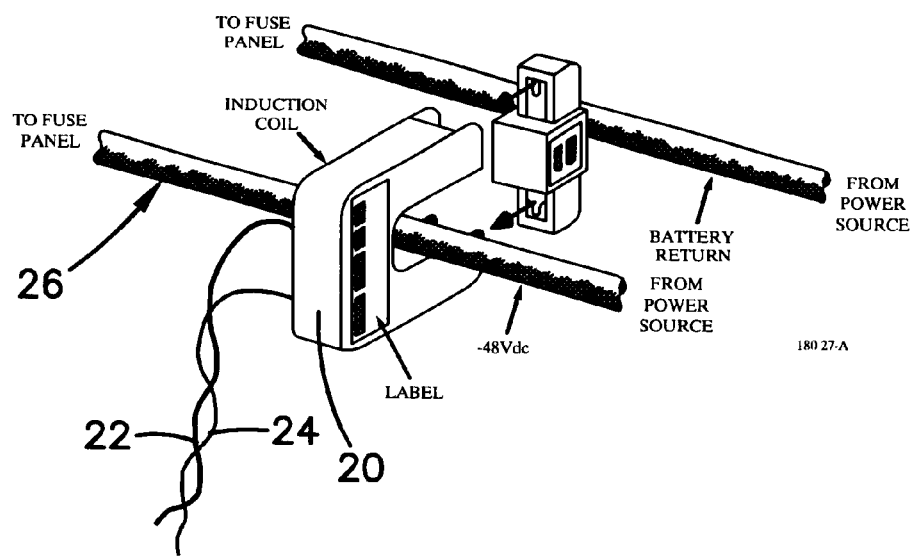
FIG. 2 is a perspective view of an induction coil connection according to a preferred embodiment of the present invention.
Figure 3:
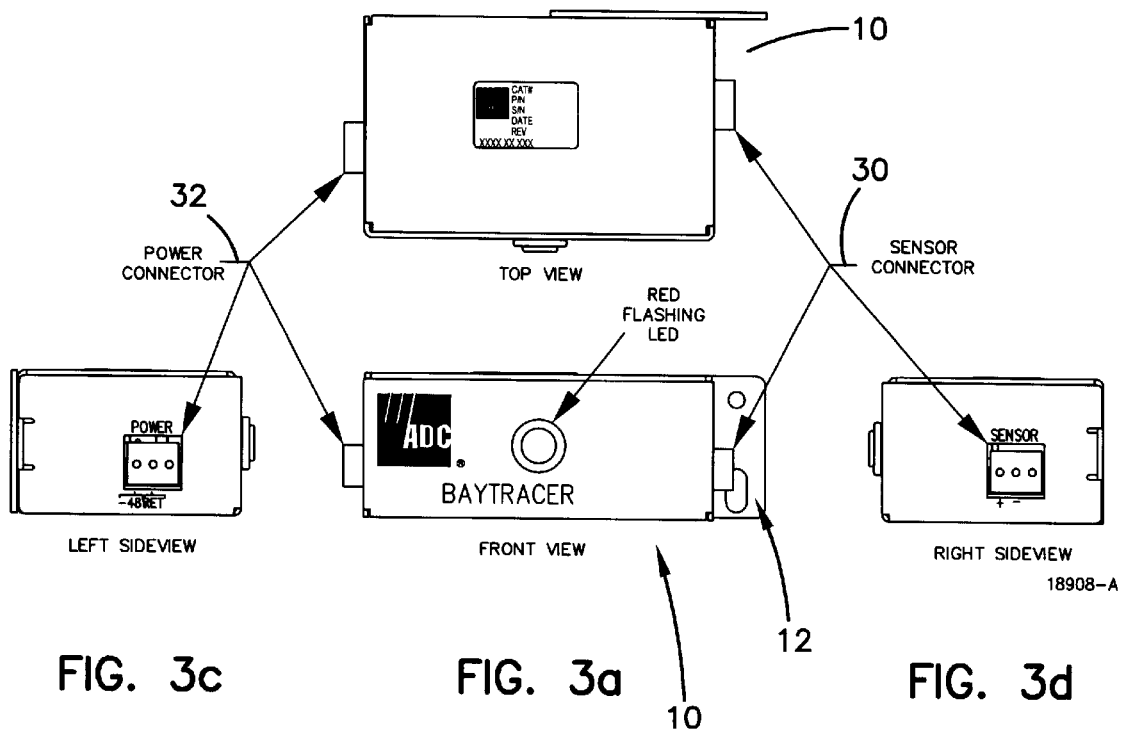
FIG. 3a–d are front, top, left side and right side views, respectively, of the sensor device shown in FIG. 1.

FIG. 2 is a perspective view of an induction coil connection according to a preferred embodiment of the present invention. As will be described in greater detail hereinafter, the induction coil 20 is coupled to the sensor device 10 by wires 22, 24. In a preferred embodiment, the induction coil 20 encircles the main −48 VDC power input conductor 26 feeding the bay fuse panel (not shown) although, as previously mentioned, any steady-state DC carrying wire can be monitored. In a preferred embodiment, the induction coil 20 is a current transformer. The coil 20 preferably shall have a sensitivity of ranging from DC to 5 AC Amperes and a maximum output voltage at 5 Amperes ranging from about 0.333 volts to about 0.666 volts. If the maximum output voltage of the coil is selected near the maximum of the range, then a less sensitive amplifier stage as will be described can be used thereby reducing the device's sensitivity to input anomalies. The induction coil 20 is formed in two parts so that it can be easily snapped around the power conductor. The induction coil 20 is commercially available from the Magnelab division of Solomon Corp. as model number SCT-0750-005.

FIGS. 3a–d are front, top, left side and right side views, respectively, of the sensor device 10 shown in FIG. 1 At one end of the sensor device 10, is a sensor connector 30 to which the induction coil 20 of FIG. 2 is coupled to the device 10 and at the opposite end of the device 10 is a power connector 32 as will be described hereinafter.

Figure 4:
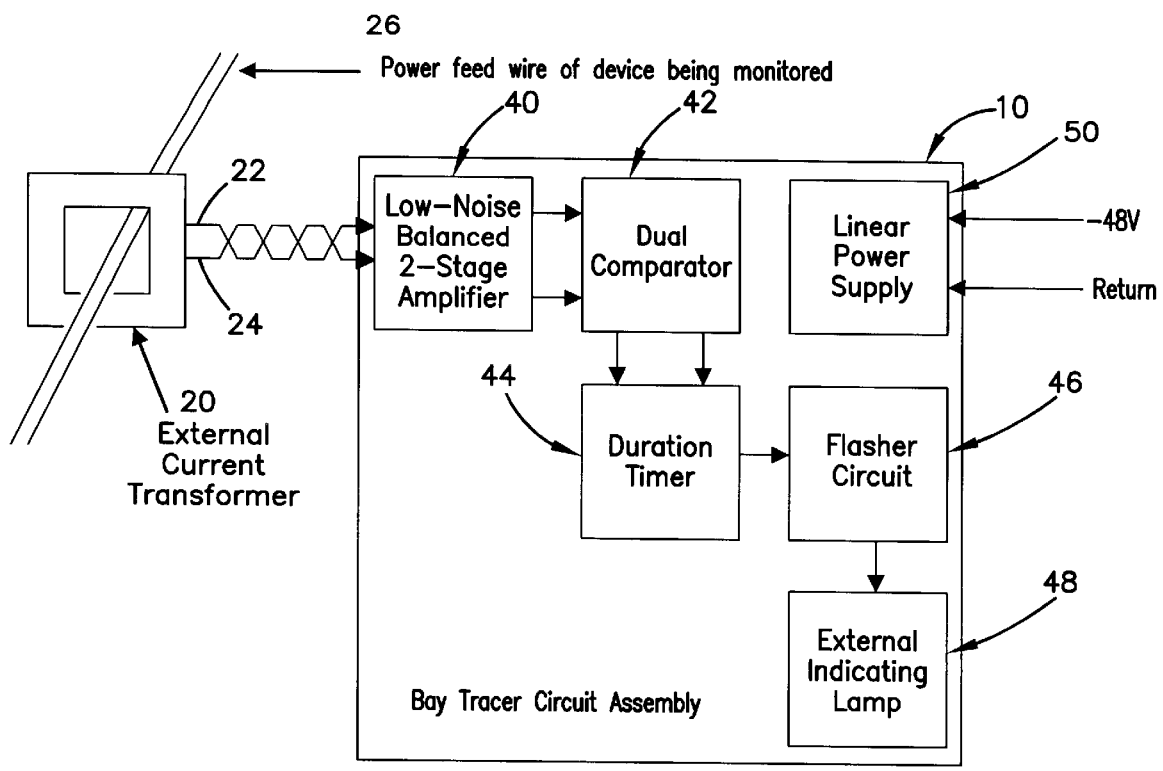
FIG. 4 is a block diagram of the circuitry inside the sensor device and induction coil shown in FIGS. 1 and 2 according to a preferred embodiment of the present invention.

FIG. 4 is a block diagram of the circuitry inside the sensor device 10 and induction coil 20 shown in FIGS. 1 and 2 according to a preferred embodiment of the present invention. The sensor device 10 includes an amplifier 40, a comparator 42, a timer 44, a flasher circuit 46, an external indicator 48, and a power supply 50.

Figure 5A:
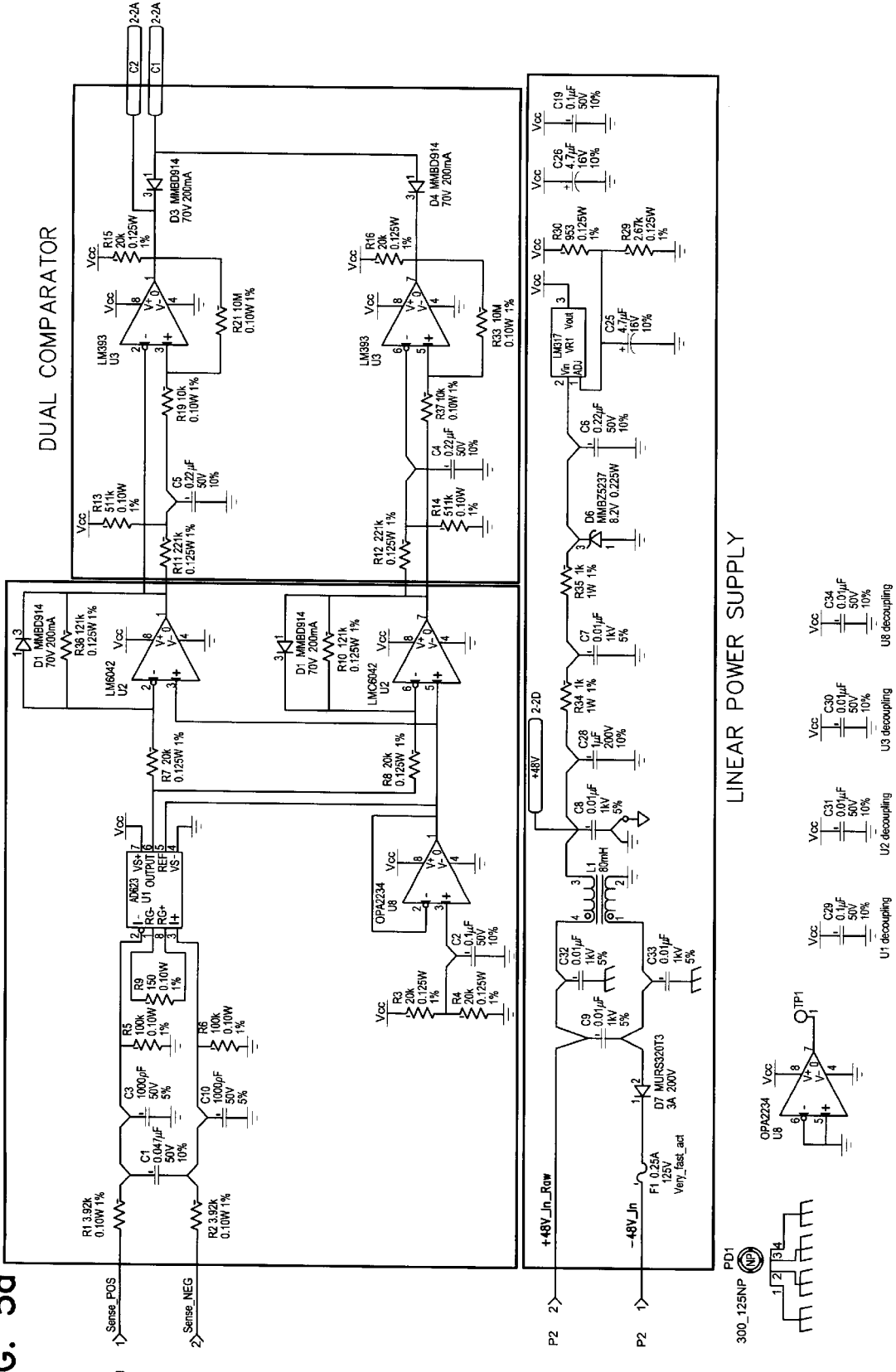
FIGS. 5a, b are detailed circuit diagrams of the block diagram shown in FIG. 4.
Figure 5B:
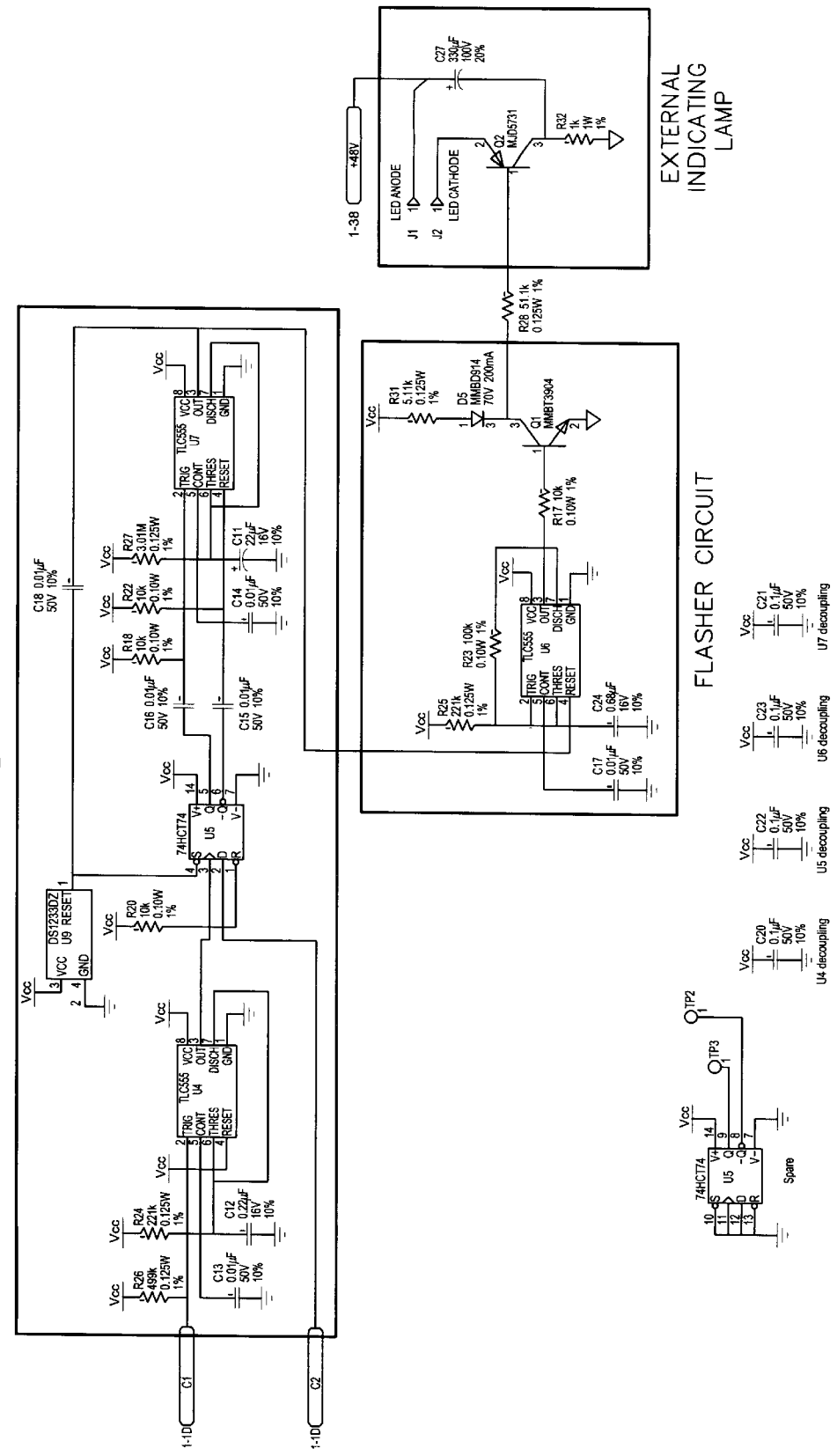

As previously described, the induction coil 20 is placed around a steady-state DC carrying wire such as a single −48 V DC power feed wire to the bay being monitored by the sensor device and monitors changes in current. Since the current being monitored is DC, the nominal output of the induction coil 20 will be null. Instantaneous changes in the input current of the bay being monitored resulting from a trace ending in the bay cause directional voltage impulses to be generated and transmitted to the sensor device 10 over wires 22, 24. The input amplifier block 40 is preferably a balanced, front-end, high-gain, low noise, two-stage operational amplifier. Its input is biased at about 2.5 V DC through a standard voltage follower circuit (not shown). This allows for bi-directional current/voltage detection while using a single supply configuration of the opamp circuit (not shown) itself. The gain of the first stage is set to 56.5 dB to compensate for the low-level nature of the input signal. The second stage is calibrated to provide the appropriate levels to the comparator circuit. Sufficient capacitive decoupling should be provided to minimize the effects of extraneous noise in the device. FIGS. 5a, b show a detailed diagram of the amplifier circuitry as well as all the other circuitry of the sensor 10.

The output of the amplifier block 40 is sent to the comparator block 42. Preferably, the comparator block 42 is a dual comparator integrated circuit. The compurgator block 42 has two separate comparators: the first detecting the levels associated with a "jack in" condition and the second detecting the levels associated with a "jack out" condition. A "jack in" condition refers to an active trace ending in the bay being monitored. A "jack out" condition refers to a deactivation of the trace. The outputs of the comparator block 42 are sent to the timer block 44.

The timer block 44 is preferably a model TL555C timer available from Texas Instruments configured as a non-retriggerable monostable multivibrator. Upon the detection of a "jack in" condition from the comparator block 42, the output of the monostable multivibrator fires and the duration timer 49 remains triggered until a predetermined time period has passed, preferably 90 second, or until a "jack out" condition has been detected by the comparator block 42.

The flasher circuit 46 is also preferably a TL555C timer, however, configured as an astable multivibrator and is controlled by the output of the timer block 44. The flasher circuit output toggles at a nominal 4 Hz rate and drives the external indicator 48.

The external indicator 48 is preferably a lamp, and, more preferably, an LED. The external indicator 48 is provided as the primary output indicator of the sensor device 10. Upon detection of a "jack in" condition, the external indicator is caused to flash at about a 4 Hz rate for a period of 90 seconds. After the initial 90 seconds has passed, the indicator will stop flashing until the next detection of a "jack in" condition. The detection of a "jack out" condition disables the external indicator. It will be appreciated that other time periods and frequencies may be used. In addition, the flasher circuit can be eliminated altogether if desired. In addition other external indicators, both visual and audible may be used. In addition, the external indicator need not be located on the sensor device itself but may be located remotely therefrom such as at a central control panel. The external indicator may be a computing device coupled to the sensor device that is located remotely from the device. The computing device may be coupled to a display where a technician is provided the indication. Combinations of these external indicators may also be used depending on the installation of the sensor device.

Preferably a sensor device 10 according to the present invention is mounted to each bay in a central office or other environment. The induction coil may encircle one or more tracer wires, one or more DC feeds or power feeds or one or more steady-state DC lines.

The power supply circuit 50 is an adjustable linear filter. Its output is preferably set to about 5.0 VCD±0.25 VDC. A particular advantage of the present invention is that the sensor device 10 is powered from the −48 VDC central office power source and thus does not require its own power source. External connections include a −48 VDC connection wire 52 and a return wire 54. Preferably a reverse blocking diode (not shown) is incorporated within the sensor device to prevent damage in case of a power lead reversal.

In summary, the sensor device 10 according to a preferred embodiment of the present invention checks for a change in current on the main or branch circuit −48 VDC power feed to the bay fuse panel caused by a trace on a far end bay and uses this change to activate the external indicator to better direct a technician to the correct bay.

FIGS. 5*a*, *b* are detailed circuit diagrams of the block diagram shown in FIG. 4. Phantom boxes have been drawn around portions of the circuitry relating to the block diagram of FIG. 4 and have been so labeled.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A monitor circuit for indicating whether a digital signal cross-connect bay has a cross-connect jack that cross-connects equipment being tested, the circuit comprising:
   a sensor having an input operatively coupled to a steady-state DC carrying wire wherein the sensor detects a change in current flowing in the wire and generates an output signal at its output upon detection of a change of current flowing;
   a comparator having an input operatively coupled to the output of the sensor wherein the comparator generates an output signal if the output of the sensor is above a predetermined level;
   an indicator operatively coupled to the output of the comparator; and
   a linear filter coupled to a power supply that also supplies power to the cross-connect bay for powering the monitor circuit, wherein the comparator sends a signal to the indicator if the sensor detects a current change in the wire, causing the indicator to generate an indication.

2. The circuit of claim 1 wherein the steady-state DC carrying wire is a power feed wire of the bay.

3. The circuit of claim 1 wherein the sensor is a current transformer.

4. The circuit of claim 3 wherein the transformer is an induction coil.

5. The circuit of claim 1 wherein the indicator is a lamp located on an exterior of the cross-connect bay so as to be visible to a person in the same room as the bay.

6. The circuit of claim 5 wherein the lamp is an LED.

7. The circuit of claim 1 further comprising a balanced amplifier operatively coupled to the output of the sensor and the input of the comparator wherein the amplifier amplifies the output of the sensor and transmits the amplified output of the sensor to the comparator.

8. The circuit of claim 7 wherein the sensor is a current transformer coupled to the input of the balanced amplifier.

9. The circuit of claim 5 further comprising a duration timer operatively coupled to the output of the comparator and an input of the indicating lamp wherein the duration timer is activated by the output of the comparator and supplies an output signal to the lamp for a predetermined amount of time causing the lamp to illuminate.

10. The circuit of claim 8 further comprising a flasher circuit coupled to an output of the duration timer and the input of the indicator wherein the flasher circuit supplies intermittent power to the lamp to cause the lamp to flash for a predetermined amount of time upon activation by the timer.

11. A monitor circuit for indicating whether a digital signal cross-connect bay has a cross-connect jack that cross-connects equipment being tested, the circuit comprising:
    a comparator receiving a signal output by a sensor that senses a change in current in a steady-state DC carrying wire;
    an indicator operatively coupled to an output of the comparator; and
    a linear filter coupled to a power supply that also supplies power to the cross-connect bay for powering the monitor circuit, wherein the comparator sends a signal to the indicator if the sensor detects a current change in the wire causing the indicator to generate an indication.

12. The circuit of claim 11 wherein the steady-state DC carrying wire is a power feed wire of the bay.

13. The circuit of claim 11 wherein the indicator is a lamp located on an exterior of the cross-connect bay so as to be visible to a person in the same room as the bay.

14. The circuit of claim 13 wherein the lamp is an LED.

15. The circuit of claim 11 further comprising a balanced amplifier operatively coupled to an output of the sensor and an input of the comparator wherein the amplifier amplifies the output of the sensor and transmits the amplified output of the sensor to the comparator.

16. The circuit of claim 11 further comprising a duration timer operatively coupled to an output of the comparator and an input of the indicator lamp wherein the duration timer is activated by the output of the comparator and supplies an output signal to the lamp for a predetermined amount of time causing the lamp to illuminate.

17. The circuit of claim 16 further comprising a flasher circuit coupled to an output of the duration timer and an input of the indicator wherein the flasher circuit supplies intermittent power to the lamp to cause the lamp to flash for a predetermined amount of time upon activation by the timer.

18. A monitor circuit for indicating whether a digital signal cross-connect bay has a cross-connect jack that cross-connects equipment being tested, the circuit comprising:
    a balanced amplifier receiving a signal output by a sensor that senses a change in current in a power feed wire of the bay, the sensor not being electrically connected in series with the power feed wire;
    a comparator operatively coupled to an output of the balanced amplifier; and
    an indicator coupled to an output of the comparator wherein the comparator sends a signal to the indicator if the sensor detects a current change in the power feed wire of the bay causing the indicator to generate an indication.

19. The circuit of claim 18 further comprising a linear filter coupled to a power supply that also supplies power to the cross-connect bay for powering the monitor circuit.

20. The circuit of claim 18 wherein the indicator is a lamp located on an exterior of the cross-connect bay so as to be visible to a person in the same room as the bay.

21. The circuit of claim 20 wherein the lamp is an LED.

22. The circuit of claim 18 further comprising a balanced amplifier operatively coupled to an output of the sensor and an input of the comparator wherein the amplifier amplifies the output of the sensor and transmits the amplified output of the sensor to the comparator.

23. The circuit of claim 22 further comprising a duration timer operatively coupled to an output of the comparator and an input of the indicator wherein the duration timer is activated by the output of the comparator and supplies an output signal to the lamp for a predetermined amount of time causing the lamp to illuminate.

24. The circuit of claim 22 further comprising a flasher circuit coupled to an output of the duration timer and an input of the indicator wherein the flasher circuit supplies intermittent power to the lamp to cause the lamp to flash for a predetermined amount of time upon activation by the timer.

25. A module for tracing DSX circuits, comprising:
   a housing including circuitry of claim 11 or 18 located inside the housing, a sensor input and a power input and wherein the indicator is located on an outside surface of the housing; and,
   a sensor connectable to a power feed to sense changes in current in the power feed wire, the sensor not being electrically connected in series with the power feed wire, and wherein the sensor is operatively coupled to the sensor input of the housing.

26. The module of claim 25 further comprising a bracket for mounting the housing on a DSX bay.

* * * * *

UNITED STATES PATENT AND TRADEMARK OFFICE
CERTIFICATE OF CORRECTION

PATENT NO. : 6,300,877 B1
DATED : October 9, 2001
INVENTOR(S) : Schannach et al.

It is certified that error appears in the above-identified patent and that said Letters Patent is hereby corrected as shown below:

<u>Title page, Item [54] and Column 1, line 1,</u>
Title, "DSX BAYTRACER ILLUMINATOR" should read -- DSX ILLUMINATOR --.

<u>Column 6,</u>
Line 57, "an indicator coupled" should read -- an indicator operatively coupled --.

Signed and Sealed this

Third Day of September, 2002

Attest:

Attesting Officer

JAMES E. ROGAN
*Director of the United States Patent and Trademark Office*